Oct. 12, 1943.    H. A. ALTORFER ET AL    2,331,644
TURBINE INLET PIPING
Filed Sept. 10, 1942    2 Sheets-Sheet 2

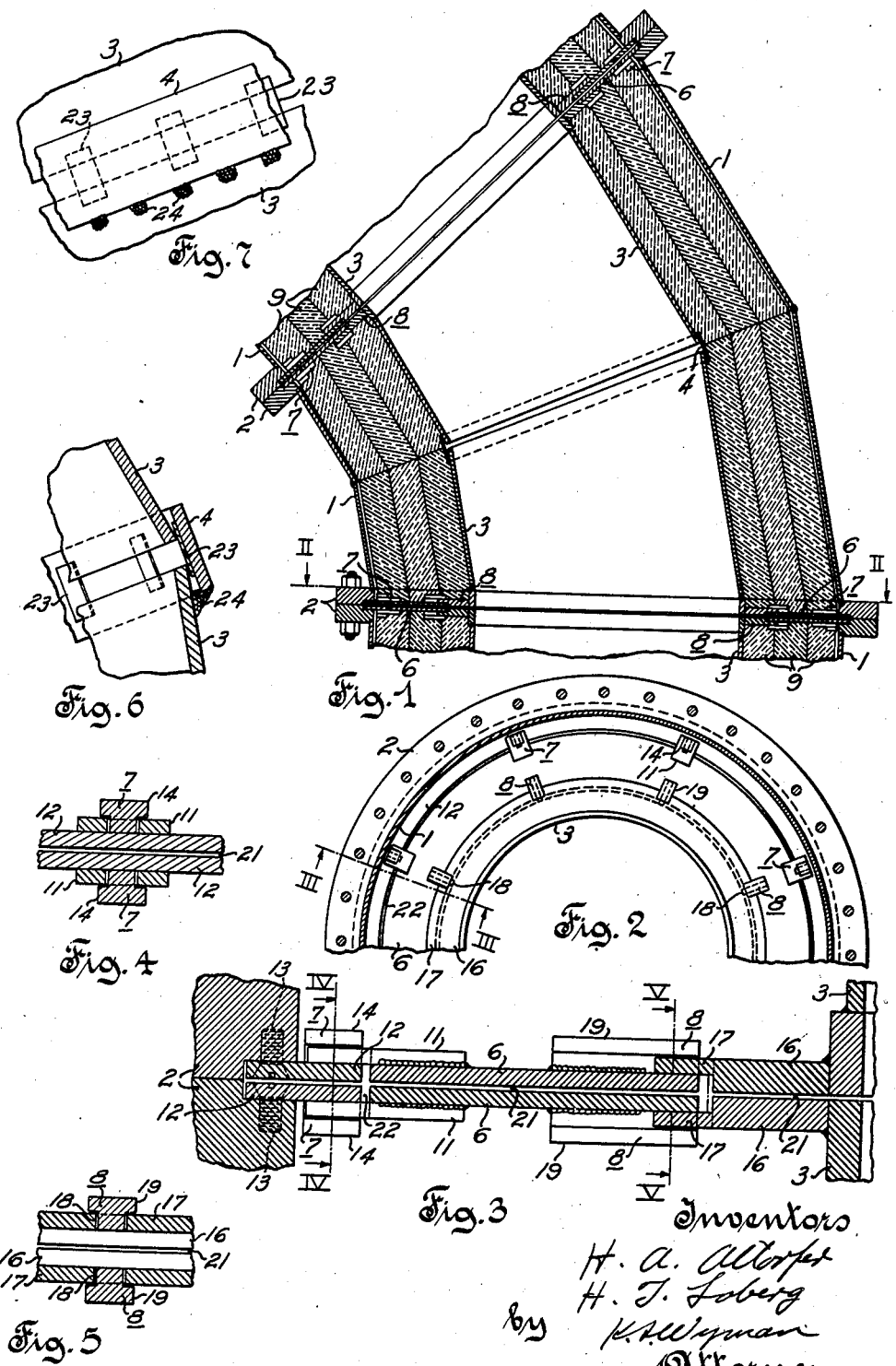

Inventors
H. A. Altorfer
H. T. Toberg
by K. L. Wyman
Attorney

Patented Oct. 12, 1943

2,331,644

UNITED STATES PATENT OFFICE 2,331,644

TURBINE INLET PIPING

Hans A. Altorfer and Henry Thomas Loberg, Wauwatosa, Wis., assignors to Allis-Chalmers Manufacturing Company, Milwaukee, Wis., a corporation of Delaware Application September 10, 1942, Serial No. 457,836

16 Claims. (Cl. 138—63)

This invention relates generally to elastic fluid turbine apparatus and more particularly to high-temperature gaseous motive fluid confining and conducting structures capable of safely withstanding large variations in the temperature and pressure of the confined fluid.

The invention is particularly applicable, although in no manner limited, to the jacketed combustion chambers and/or motive fluid conductors employed in combustion turbine systems since the inner motive fluid confining wall becomes extremely hot and incapable of safely withstanding the stresses set up therein (a) by appreciable differences in the pressures of the fluids acting upon opposite sides of said wall, and (b) by its expansion and contraction, both longitudinally and radially, relative to the outer surrounding wall. A recently proposed construction effectively equalizes the pressures on opposite sides of the motive fluid confining wall or lining by providing breathing openings therein and filling the space between the inner and outer walls with permeable insulation and materially reduces the stresses in the inner wall attributable to its expansion and contraction, both longitudinally and radially, relative to the outer surrounding wall by mounting same in a manner permitting movements thereof both longitudinally and radially with respect to said outer wall.

Said recently proposed construction is not entirely satisfactory since it embodies a double walled lining which materially increases manufacturing, assembly and replacement costs, since it does stress the insulation retaining shell to the extent necessary to flex the annular disks connecting same with the surrounding outer wall, said stressing occurring under high temperature conditions which render said shell incapable of withstanding same, and since too much heat is transmitted or conducted to the surrounding outer wall.

It is therefore the primary object of this invention to provide an improved inner wall or lining construction which affords one or more of the following results and/or advantages: (1) the elimination of the double walled lining construction, thereby materially reducing manufacturing, installation and replacement costs; (2) a greatly simplified and a far more durable construction effective at all times to maintain concentricity between the inner and outer wall portions; (3) a reduction in the heat transmitted to the surrounding outer wall; and (4) preventing the turning of the preformed blocks or slabs of insulation disposed in the space between the inner and outer wall. In accordance with this invention, one or more of the aforementioned results and/or advantages are attained by a single walled lining which is formed by longitudinally spaced sections having each end coaxially interconnected with opposed portions of the inner surface of the outer surrounding wall by means of an interposed annular disk and circumferential series of outer and inner radially alined connectors permitting radial movement of the connecting disk relative to the outer wall and permitting radial movement of the disk and of the connected inner wall section relative to each other.

The invention accordingly consists of the various features of construction, combinations of elements, and arrangements of parts as more fully set forth in the appended claims and in the detailed description, reference being had to the accompanying drawings, in which:

Fig. 1 is a longitudinal section through a section of turbine inlet piping embodying the invention;

Fig. 2 is a partial transverse section taken on line II—II of Fig. 1;

Fig. 3 is an enlarged section taken on line III—III of Fig. 2;

Fig. 4 is a partial section taken on line IV—IV of Fig. 3;

Fig. 5 is a partial section taken on line V—V of Fig. 3;

Fig. 6 is a fragmentary section illustrating the manner in which the rings covering the space between the adjacent free ends of the lining sections are positioned and secured in place;

Fig. 7 is an exterior view of the structure shown in Fig. 6;

Figure 12:
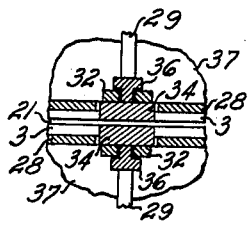
Fig. 12 is a section taken on line XII—XII of Fig. 11.
Figure 8:
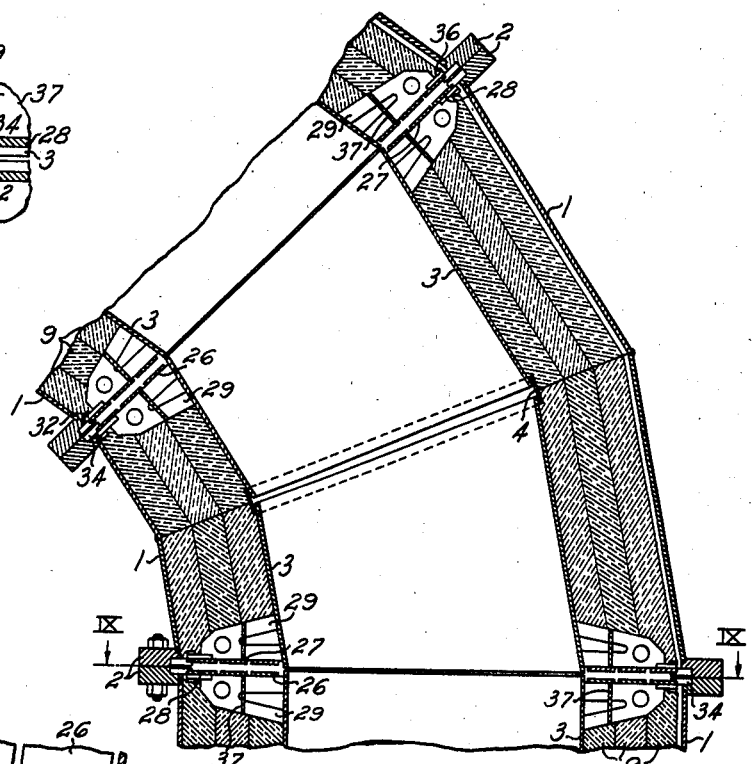
Fig. 8 is a view similar to Fig. 1 showing a modified construction.

Referring to Figs. 1 and 2, it is seen that piping embodying the invention may comprise an outer wall or shell formed by annular sections 1 having flanged ends 2 which may be bolted or otherwise removably secured together in abutting relation as shown, a fluid confining lining formed by pairs of axially spaced annular sections 3, a ring 4 surrounding and non-sealingly covering the gap between the adjacent ends of the sections 3 of each pair, an annular disk 6 interposed between the remote ends of the sections 3 of each pair and the opposed inner surface of the outer wall adjacent the flanges 2, circumferential series of outer and inner radially alined connections 7 and 8 rendering the outer wall, the disk 6 and the inner lining section 3 radially removable relative to each other, and preformed blocks 9 of permeable insulation substantially filling the space between a pair of said sections, the opposed portion of the outer wall and the inter-connecting disks 6.

Referring to Figs. 3 and 4, it is seen that the outer connections 7 comprise a series of circumferentially spaced bifurcated tabs 11 which are secured to the outer peripheral portion of the disk 6 and extend radially outward therefrom, a ring 12 which is removably secured in an annular recess formed in the periphery of the flanged portion 2 of the outer section 1 in any suitable manner such as by the screws 13, and a series of circumferentially spaced radially extending T-shaped tabs 14 which are secured to the ring 12 with their stem portions disposed between the bifurcated ends of the tabs 11 as shown in Fig. 4. The inner connections 8 comprise an outward, radially extending flange 16 formed on or secured to the adjacent end of the inner lining section 3 and having an outer portion 17 of reduced thickness which is provided with a series of circumferentially spaced, radially extending slots 18 and a series of circumferentially spaced T-shaped tabs 19 which are secured to the inner peripheral portion of the disk 6 with their stem portions disposed within the opposed slot 18 in the flange 16 as shown in Fig. 5.

The depth of the recesses in which the rings 12 are disposed is somewhat greater than the thickness of the rings 12, and since the thickness of the disks 6 is substantially equal to that of the rings 12, the resulting structure affords an axial clearance or space 21 between the adjacent pairs of lining sections 3 and between the adjacent flanges 16, disks 6 and rings 12 as is clearly shown in Fig. 3. In addition, the outer periphery of each disk 6 is radially spaced from the inner periphery of the opposed ring 12, thereby providing a passage 22 placing the space 21 in communication with that containing the insulation 9. In this connection, it should now be obvious that variations in the pressure of the gas flowing through the lining sections 3 result in similar variations in the pressure within the space filled with insulation 9 due to the breathing action afforded by the space 21 and the passage 22. In addition, it should also be obvious that the outer and inner connectors 7 and 8 render the disks 6, the outer wall and the inner lining sections 3 radially movable relative to each other.

The ring 4 is preferably spaced from the axially spaced end portions of a pair of sections 3 and this construction is accomplished, reference being had to Fig. 6 and Fig. 7, by interposing spacing sections 23 between the ends of the sections 3 and the ring 4 (see Fig. 6) and by intermittently welding one edge of the ring 4 to the adjacent end portion of a section 3 as indicated at 24. After the welding has been completed, the spacing sections 23 are removed which leaves the ring 4 spaced from the axially spaced ends of the sections 3, thereby providing additional breathing openings placing the interior of the sections 3 in communication with the space containing the insulation 9.

The structure shown in Fig. 1 may be readily assembled by first providing an inner section 3 with the flange 16, then clamping the disk 6 to the flange 16 and welding the T-shaped tabs 19 in place on the disk 6 with their stem portions disposed in the slots 18, then clamping the ring 12, to which are already secured the T-shaped tabs 14, to the disk 6 and completing this portion of the assembly by placing the tabs 11 on the disk 6 with the bifurcations receiving the stem portions of the T-shaped tabs 14 on the ring 12 and welding the tabs 11 to the surface of the disk 6 as shown. If the ring 4 has not already been secured to the section 3 as described in connection with Figs. 6 and 7, it then is attached at this time. The insulation is next placed around the section 3, preferably three layers of preformed blocks are used, as shown, (the insulation being held in position by a suitable strip or band of metal not shown) and the outer section 1 can then be slid coaxially over the insulation and secured to the ring 12 by means of the screws 13. In applying the invention to a section of curved piping, the outer sections 1 are preferably made in two annular parts and after each of said parts has been secured to an assembly comprising an inner lining section 3, a disk 6 and a ring 12 as just described, the assemblies are then brought together, in angularly displaced relation with the adjacent unflanged ends of the annular outer parts abutting as shown in Fig. 1, whereupon said abutting ends are welded together to provide a unitary section 1 which may be bolted or otherwise removably secured to similar sections to provide a pipe of desired length. The ends of the preformed blocks of insulation which abut the flange 16, disk 6 and ring 12 are provided with recesses adapted to receive therein the tabs 11, 14 and 19 which act to prevent the insulating blocks from turning relative to each other and relative to the inner and outer wall sections.

Figure 10:
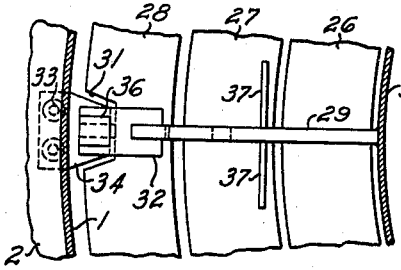
Fig. 10 is an enlarged view of one of the connectors shown in Fig. 9.
Figure 11:
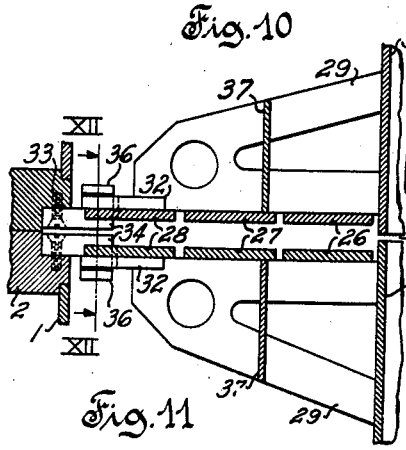
Fig. 11 is an enlarged view of a pair of the adjacent connections shown in Fig. 8.
Figure 9:
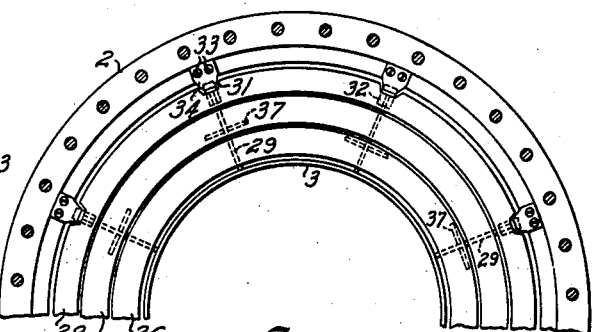
Fig. 9 is a view taken on line IX—IX of Fig. 8.

The modified construction shown in Figs. 8-12 inclusive differs from that shown in Figs. 1-7 inclusive in that instead of a single disk 6, a plurality of annular disks, three in this case designated 26, 27 and 28, are united in radially spaced concentric relation with respect to each other and with respect to the lining section 3 by means of a radially extending bifurcated connector 29 having its inner bifurcated ends welded or otherwise securely united with the outer surface portion at the end of a lining section 3; in that the outer edge of the disk 28 is provided with a series of circumferentially spaced radially extending notches 31, in that the disk 28 is provided with a series of circumferentially spaced radially extending tabs 32 which overlie and are narrower than said notches and which have their inner ends slotted to receive therein the outer end of the connector 29 and have bifurcated outer ends adapted to receive therein a T-shaped tab carried by the outer wall section 1, and in that the flanged portion 2 of the outer wall section is provided with an annular recess in which are removably secured, as by means of screws 33, a series of circumferentially spaced inwardly extending radial tabs 34 terminating in T-shaped heads 36 disposed between the bifurcations of the opposed tabs 32 on the disk 28 as is best shown in Figs. 10, 11 and 12. The connectors 29 may be provided with laterally extending stiffening flanges or members 37 secured to the underlying disk 26 or 27 as shown.

In all other respects, the aforementioned modified construction is substantially identical to that shown in Figs. 1-7 inclusive and since like numerals have been used to designate the same or similar parts, a further description regarding the assembly and the functioning of the various parts is believed unnecessary for a complete understanding of the invention. In this connection, however, it should be noted that since the disks 26, 27 and 28 are radially spaced from each other and from the inner and outer wall sections (the only interconnections being the connectors 29 and tabs 32 and 34), less heat will be transmitted to the outer wall section and that the breathing action is greatly improved by the additional openings between the disks and between the inner disk and the liner section providing communication between the space 21 and the space containing the insulation 9.

The invention is of general application with respect to high temperature fluid confining structures, and although the constructions herein illustrated and described are particularly applicable to combustion gas turbine inlet piping, it should be understood that it is not intended to limit the invention to the exact details of construction herein shown and described as various modifications within the scope of the appended claims may occur to persons skilled in the art.

It is claimed and desired to secure by Letters Patent:

1. A confining structure for a high temperature gaseous fluid comprising an annular outer wall, a fluid confining lining disposed within and spaced from said outer wall, and interconnecting means including annular disks interposed between said lining and outer wall and rendering said disks movable radially relative to said outer wall and rendering said disks and lining radially movable relative to each other.

2. A confining structure for a high temperature gaseous fluid comprising an annular outer wall, a fluid confining lining disposed within and spaced from said outer wall, and interconnecting means including longitudinally flexible annular disks interposed between said lining and outer wall and rendering said disks movable radially relative to said outer wall and rendering said disks and lining radially movable relative to each other.

3. A confining structure for a high temperature gaseous fluid comprising an annular outer wall, an inner fluid confining lining, and means including longitudinally spaced annular disks and radially alined bifurcated elements interconnecting said disks with said lining and outer wall and rendering said disks movable radially relative to said outer wall and rendering said lining and disk movable radially relative to each other.

4. A confining structure for a high temperature gaseous fluid comprising an annular wall, a fluid confining lining disposed within and spaced from said wall, said lining including a pair of annular sections having their adjacent ends arranged for relative longitudinal movement, and annular disks surrounding the remote ends of the sections of said pair and being operatively interconnected with said remote ends and with opposed portions of said wall to support the remote ends of the sections of said pair within said wall for radial movement relative thereto.

5. A confining structure for a high temperature gaseous fluid comprising an annular shell, a fluid confining lining disposed within and spaced from said shell, said lining including a pair of annular sections having their adjacent ends arranged for relative longitudinal movement and to provide an opening for the passage of fluid into the space between said lining and shell, annular disks surrounding the remote ends of the sections of said pair and being operatively interconnected with said remote ends and with opposed portions of said shell to support the remote ends of the sections of said pair within said shell for radial movement relative thereto, and permeable insulation substantially filling said space.

6. A confining structure for a high temperature gaseous fluid comprising an annular wall, a fluid confining lining disposed within and spaced from said wall, said lining including a pair of axially spaced annular sections and a surrounding ring covering the gap between the adjacent ends of the sections of said pair, said ring being secured to one of said adjacent ends, and annular disks surrounding the remote ends of the sections of said pair and being operatively interconnected with said remote ends and with opposed portions of said wall to support the remote ends of the sections of said pair within said wall for radial movement relative thereto.

7. A confining structure for a high temperature gaseous fluid comprising an annular wall, a fluid confining lining disposed within and spaced from said wall, said lining including a pair of axially spaced annular sections and a surrounding ring nonsealingly covering the gap between the adjacent ends of the sections of said pair, said ring being secured to one of said adjacent ends, annular disks surrounding the remote ends of the sections of said pair and being operatively interconnected with said remote ends and with opposed portions of said wall to support the remote ends of the sections of said pair within said wall for radial movement relative thereto, and permeable insulation substantially filling the space between said lining and shell.

8. A confining structure for a high temperature gaseous fluid comprising an annular wall, a fluid confining lining disposed within and spaced from said wall, said lining including axially spaced pairs of annular sections with the adjacent ends of the sections of each pair arranged for relative longitudinal movement, and annular disks surrounding the remote ends of the sections of said pairs and being operatively interconnected with said remote ends and with opposed portions of said shell to support the remote ends of the sections of said pairs within said shell for radial movement relative thereto.

9. A confining structure for a high temperature gaseous fluid comprising an annular wall, a fluid confining lining disposed within and spaced from said wall, said lining including axially spaced pairs of annular sections with the adjacent ends of the sections of each pair arranged for relative longitudinal movement, annular disks surrounding the remote ends of the sections of said pairs and being operatively interconnected with said remote ends and with opposed portions of said wall to support the remote ends of the sections of said pairs within said wall for radial movement relative thereto, said interconnection providing openings through which fluid entering the gap between said axially spaced pairs of sections may pass into the space between said lining and wall, and permeable insulation substantially filling said space.

10. A confining structure for a high temperature gaseous fluid comprising an annular wall, a fluid confining lining disposed within and spaced from said wall, said lining including axially spaced pairs of annular axially spaced sections and a surrounding ring covering the gap between the adjacent ends of the sections of each pair, said ring being secured to one of said adjacent ends, and annular disks surrounding the remote ends of the sections of said pairs and being operatively interconnected with said remote ends and with opposed portions of said wall to support the remote ends of the sections of said pairs within said wall for radial movement relative thereto.

11. A confining structure for a high temperature gaseous fluid comprising an annular wall, a fluid confining lining disposed within and spaced from said wall, said lining including axially spaced pairs of annular axially spaced sections and a surrounding ring nonsealingly covering the gap between the adjacent ends of the sections of each pair, said ring being secured to one of said adjacent ends, annular disks surrounding the remote ends of the sections of said pairs and being operatively interconnected with said remote ends and with opposed portions of said wall to support the remote ends of the sections of said pairs within said wall for radial movement relative thereto, said interconnections providing openings through which fluid entering the gap between said axially spaced pairs of sections may pass into the space between said lining and wall, and permeable insulation substantially filling said space.

12. A confining structure for a high temperature gaseous fluid comprising an annular wall, a fluid confining lining disposed within and spaced from said wall, said lining including a pair of annular sections having their adjacent ends arranged for relative longitudinal movement, annular disks surrounding the remote ends of the sections of said pair and being operatively interconnected with said remote ends and with opposed portions of said wall to support the remote ends of the sections of said pair within said wall for radial movement relative thereto, said interconnection providing insulation retaining members projecting into the space between said lining and shell, and preformed blocks of insulation substantially filling said space and being provided with recesses receiving said retaining members therein.

13. In a confining structure for a high temperature gaseous fluid, an annular outer wall, an annular inner wall, and means mounting said inner wall in coaxially spaced relation within said outer wall comprising annular disks adapted to surround said inner wall in radially spaced concentric relation, a plurality of circumferentially spaced and radially extending bracket members uniting said inner wall and disks in radially spaced concentric relation with respect to one another, and connectors coaxially mounting said united inner wall and disks within said outer wall for radial movement relative thereto.

14. In a confining structure for a high temperature gaseous fluid, an annular outer wall, annular disks adapted for disposition between said inner and outer walls in radially spaced coaxial relation with respect to each other and with respect to said walls, and means connecting said walls and disks in said radially spaced coaxial relation and rendering said inner wall and disks radially movable relative to said outer wall.

15. In a confining structure for a high temperature gaseous fluid, an annular outer wall, an inner wall embodying adjacent pairs of annular sections disposed in end to end relation, a series of annular disks mounted in radially spaced coaxial relation between the remote ends of each pair of said sections and opposed portions of said outer wall and forming therewith juxtapositioned compartments having breathing openings in a wall thereof, and permeable insulation substantially filling said compartments.

16. In a confining structure for a high temperature gaseous fluid, an annular outer wall, an inner wall embodying adjacent pairs of longitudinally spaced annular sections disposed in end to end relation, a surrounding ring nonsealingly covering the gap between the adjacent ends of the sections of each pair, a series of annular disks mounted in radially spaced coaxial relation between the remote ends of each pair of said sections and opposed portions of said outer wall and forming therewith juxtapositioned compartments, and permeable insulation substantially filling said compartments.

HANS A. ALTORFER.
HENRY THOMAS LOBERG.